United States Patent [19]
Peterson

[11] Patent Number: 5,501,843
[45] Date of Patent: Mar. 26, 1996

[54] WIPER CARTRIDGE

[75] Inventor: Ronald L. Peterson, Tucon, Ariz.

[73] Assignee: Vulcan Peroxidation Systems, Inc., Tucson, Ariz.

[21] Appl. No.: 323,116

[22] Filed: Oct. 14, 1994

[51] Int. Cl.⁶ .............................. B01J 19/08; B01J 19/12
[52] U.S. Cl. .................... 422/186.3; 250/432 R; 250/436
[58] Field of Search ........................ 422/186.3, 186.07, 422/186.11, 24, 905; 250/432 R, 436, 435, 437

[56] References Cited

U.S. PATENT DOCUMENTS

| | | | |
|---|---|---|---|
| 2,072,417 | 3/1937 | Berndt et al. | 99/13 |
| 3,061,721 | 10/1962 | Brenner | 250/43 |
| 3,462,597 | 8/1969 | Young | 250/43 |
| 3,904,363 | 9/1975 | Free | 21/102 R |
| 4,002,918 | 1/1977 | Graentzel | 250/431 |
| 4,151,085 | 4/1979 | Malik | 210/101 |
| 4,897,246 | 1/1990 | Peterson | 422/186.3 |
| 4,922,114 | 5/1990 | Boehme | 250/436 |
| 5,037,618 | 8/1991 | Hagar | 422/186.3 |
| 5,133,945 | 7/1992 | Hallett | 422/186.3 |
| 5,227,140 | 7/1993 | Hagar et al. | 422/186.3 |

Primary Examiner—Donald P. Walsh
Assistant Examiner—Daniel Jenkins
Attorney, Agent, or Firm—Daniel C. McKown

[57] ABSTRACT

A replaceable wiper cartridge is described which is held captive within a shuttling scraper of a type known in the art which is pushed axially through a cylindrical reaction chamber intermittently to remove reaction products from the inside surface of the reaction chamber and from the outside surface of a smaller coaxial tube that extends the length of the reaction chamber. The replaceable wiper cartridge has an annular shape that is obliquely cut to permit a slight radial expansion to accommodate the smaller coaxial tube and to engage it in a tight sliding grip so as to scrape from the smaller tube any deposits.

1 Claim, 2 Drawing Sheets

WIPER CARTRIDGE

BACKGROUND OF THE INVENTION

1. Field of the Invention

The present invention is in the field of wastewater treatment, particularly water containing harmful organic contaminants. The invention is a small part of a large and complex reactor that is used for purifying contaminated water. As the reactor purifies the water, there is a tendency for reaction products to be deposited on the internal walls and tubing of the reactor, thereby reducing the efficiency of the process. The present invention is used to remove the unwanted deposits from the interior of the reactor so as to maintain its efficiency.

2. The Prior Art

In U.S. Pat. No. 4,897,246 issued Jan. 30, 1990, there is described a type of oxidation chamber in which a liquid contaminated by undesirable organic compounds is treated. As the liquid passes through the oxidation chamber, it is subjected to intense ultraviolet radiation from powerful ultraviolet lamps that are mounted inside quartz tubes that extend through the liquid in the reaction chamber. Simultaneously, the liquid is subjected to chemical attack by the injection of hydrogen peroxide and possibly other reagents. Complex chemical reactions take place within the reactor because typically a number of contaminants are present simultaneously. U.S. Pat. No. 4,897,246 has been assigned by the present inventor to a predecessor of the assignee of the present invention.

One of the problems encountered in using the reactor was the fouling of the quartz tubes by reaction products. The fouling reduced the optical efficiency of the chamber to a point where it became necessary to interrupt the process and to remove the quartz tubes for cleaning.

In an attempt to overcome the need for interrupting the process, a shuttling scraper was developed. The shuttling scraper encircled a quartz tube and was pushed through the chamber by the pressure and flow of the liquid being treated. Upon reaching the end of the quartz tube, the scraper would park itself unobtrusively and await an occasional reversal in the direction of flow which would then carry the shuttling scraper to the opposite end of the quartz tube. The shuttling scraper and a hydraulic system for reversing the flow are described in greater detail in U.S. Pat. No. 5,227,140. The disclosures of U.S. Pat. Nos. 4,897,246 and 5,227,140 are incorporated by reference into the present description.

FIG. 1 is adapted from U.S. Pat. No. 5,527,140 and shows a shuttling scraper 12 of the prior art moving from left to right in FIG. 1 within a tubular reaction chamber 14. The shuttling scraper wipes the inside surface of the tubular reaction chamber 14 and simultaneously wipes the outside surface 16 of the quartz tube that encloses an ultraviolet lamp. After having traveled the length of the tubular reaction chamber 14, the shuttling scraper parks within an end manifold 18 while awaiting a reversal in the direction of flow of the liquid within the reactor.

The structure of the shuttling scraper of the prior art, shown enlarged in FIG. 2, is surprisingly simple. It includes a first wiper assembly 20, a second wiper assembly 22, and a spring 24 interconnecting the first wiper assembly and the second wiper assembly. The first and second wiper assemblies 20 and 22 have identical structures. A wiper 26, having the form of an annular disk and composed of a fluoroelastomer is sandwiched between two washers 28 and 30. The sandwich is held together by screws, of which the screw 32 is typical.

The spring 24 yieldingly resists both compression and tension, and is composed of a stainless steel wire in the preferred embodiment. The spring 24 serves as a resilient spacer to maintain the separation between the wiper assembly 20 and the wiper assembly 22.

The shuttling scraper cleans not only the inside surface of the tubular reaction chamber 14, but also cleans the outside surface of the quartz tube 16. The outside diameter of the wiper 26 is a few thousandths of an inch larger than the inside diameter of the tubular reaction chamber 14 and the inside diameter of the wiper 26 is a few thousandths of an inch less than the outside diameter of the quartz tube 16. In this manner, the wiper 26 engages the inside of the tubular reaction chamber 14 and the outside of the quartz tube 16 in an interference fit. The shuttling scraper is pushed through the tubular reaction chamber 14 by the entire force of the liquid and is not merely urged along by hydrodynamic drag.

Experience has demonstrated the soundness of the design of the shuttling scraper, but out of this experience has grown several ideas, described below, for greatly improving the efficiency of the shuttling scraper, particularly in difficult wiping applications.

SUMMARY OF THE INVENTION

In a first preferred embodiment of the invention, at least one wiper cartridge is included on the shuttling scraper within the space surrounded by the spring. Each wiper cartridge includes a body having the form of a pulley wheel, but cut in a more or less radial direction to allow the body to resistingly open up to accommodate the quartz tube. An O-ring under tension extends around the circumference and squeezes the body into contact against the quartz tube. In the axial direction, the wiper cartridge or cartridges are held captive between the first wiper assembly and the second wiper assembly, but, for reasons that will become clear, the wiper cartridge is not attached to the shuttling scraper.

In a second embodiment of the invention, a number of the wiper cartridges are held in a colinear axially-spaced relationship by a spacer, and the assembly is held captive within the space enclosed by the spring and bounded axially by the first wiper assembly and the second wiper assembly.

In a third embodiment, the wiper cartridge has the form of a cage coaxial with the quartz tube and having a cylindrical wall and two end plates. The space between the quartz tube and the cylindrical cage is filled by a scouring-pad-like material that is lightly pressed against the quartz tube by the elasticity of the cage.

The addition of the wiper cartridge or cartridges considerably increases the ability of the shuttling scraper to wipe the surface of the quartz tube. When the wiper cartridge is included in shuttling scraper, the weight of the shuttling scraper does not bear on the cartridge, and this extends the life of the cartridge. Also, the first and second wiper assemblies protect the wiper cartridge from the ultraviolet light and radiant heat which might tend to shorten the life of the cartridge.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 2:
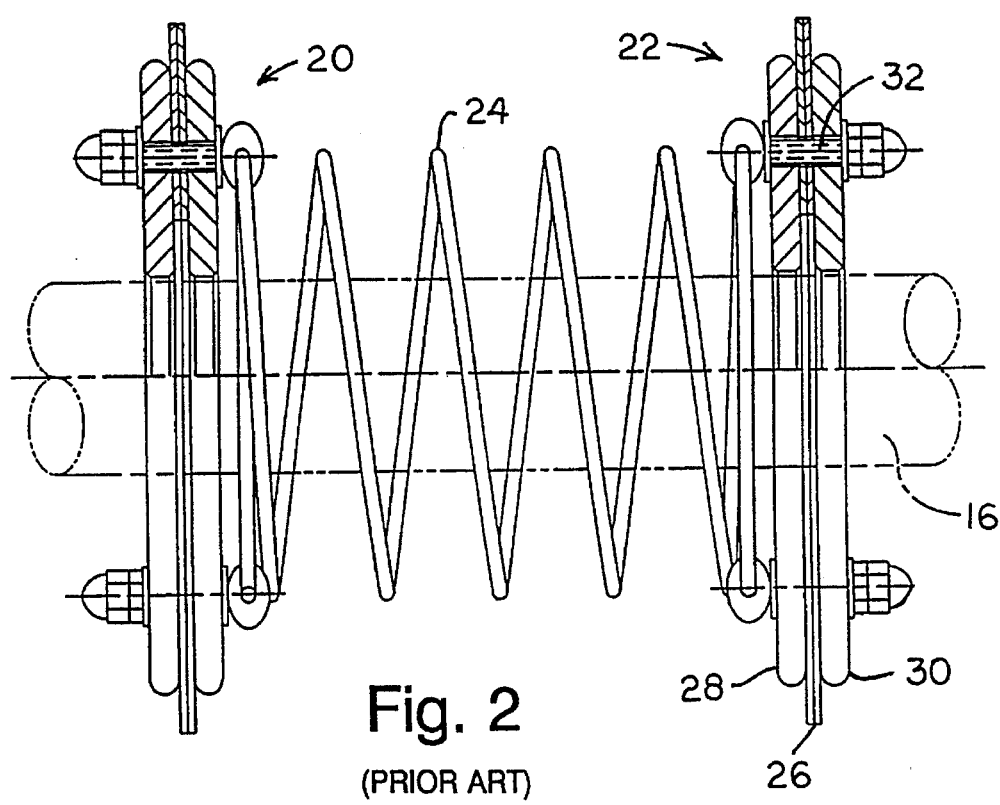
FIG. 2 is a side elevational view partly in cross section, enlarged from FIG. 1, showing the structure of a shuttling scraper of the prior art.
Figure 3:
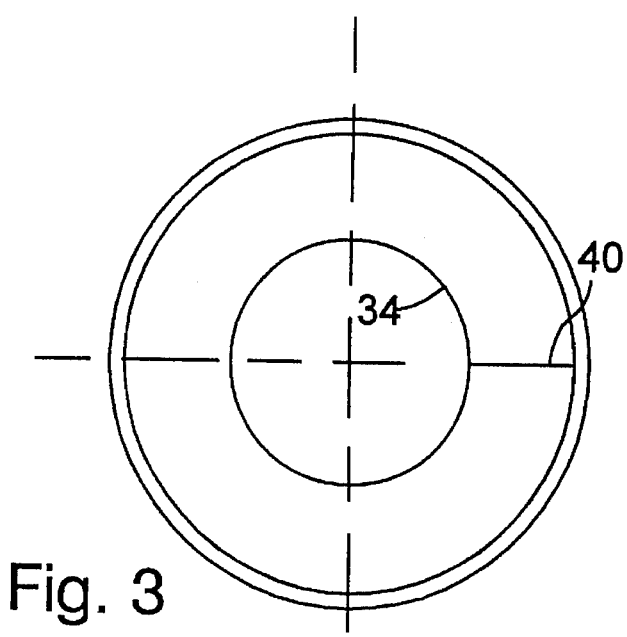
FIG. 3 is a front elevational view of a wiper in a preferred embodiment of the present invention.
Figure 4:
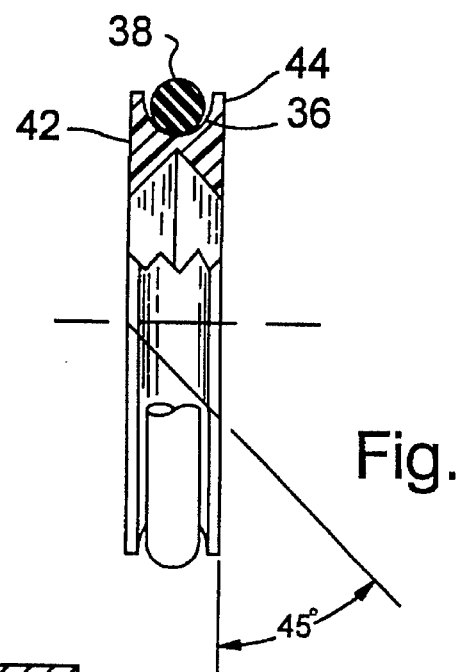
FIG. 4 is a side elevational view of the wiper of FIG. 3.

FIGS. 3 and 4 show respectively a front elevational view and a side elevational view of a wiper cartridge in accordance with a preferred embodiment of the present invention. The wiper cartridge is a unitary part made of TEFLON and has an annular shape. The diameter of the inner aperture 34 is a few thousandths of an inch less than the outside diameter of the quartz tube. The outside diameter of the wiper cartridge is a few millimeters less than the inside diameter of the spring 24 of FIG. 2. A groove 36 extends around the circumference of the wiper cartridge to receive an O-ring 38 under tension.

The wiper cartridge includes a slit 40 that extends at a 45 degree angle from one face 42 to the other face 44 of the wiper cartridge. The slit 40 permits the wiper cartridge to be forcibly expanded so that the wiper cartridge will fit tightly on the quartz tube 16. The O-ring 38 supplies a continuing tension which maintains the wiper cartridge in tight engagement with the quartz tube even as the diameter of the aperture 34 is reduced by wear. This arrangement also enables the wiper cartridge to maintain a tight engagement with the quartz tube as the wiper cartridge moves along the quartz tube and encounters minor variations in the diameter and circularity of the quartz tube.

The relationship between the wiper cartridge of FIG. 3 and the shuttling scraper of FIG. 2 will become apparent from a consideration of how the combination is assembled. First, the first wiper assembly 20 of FIG. 2 is placed on the quartz tube 16 near one end of it. The spring 24 has already been attached to the first wiper assembly 20. Thereafter, one or more of the wiper cartridges of FIG. 3 are slipped over the end of the quartz tube and pushed into the space enclosed by the spring 24. Up to six wiper cartridges can be used in each shuttling scraper depending on the difficulty of the wiping application encountered. The diameter of the wiper cartridge of FIG. 3 is smaller than the inside diameter of the spring 24, and thus, the wiper cartridge does not touch or interfere with the working of the spring 24. After the wiper cartridge or cartridges have been slid into the space within the spring 24, the second wiper assembly 22 is placed on the quartz tube 16, and the second wiper assembly 22 is connected to the spring 24 by means of the screws 32. Thus, the wiper cartridge or cartridges of FIG. 3 are captured on the quartz tube 16 between the first wiper assembly 20 and the second wiper assembly 22. As described above, these wiper assemblies are pushed along by the pressure of the water being treated, and the wiper cartridge or cartridges are pushed along by the first wiper assembly 20 or the second wiper assembly 22, whichever is trailing. Because they grip the quartz tube tightly, the wiper cartridges are able to scrape from the quartz tube whatever deposits have accumulated there. Accordingly, wear due to wiping the tube is confined to the cartridge assembly which is easier and less costly to replace than the wiper assemblies on the shuttling scraper.

The weight of the shuttling scraper is on the first and second wiper assemblies 20 and 22 rather than on the wiper cartridge, and this avoids deformation over time thereby extending the life of the wiper.

Figure 1:
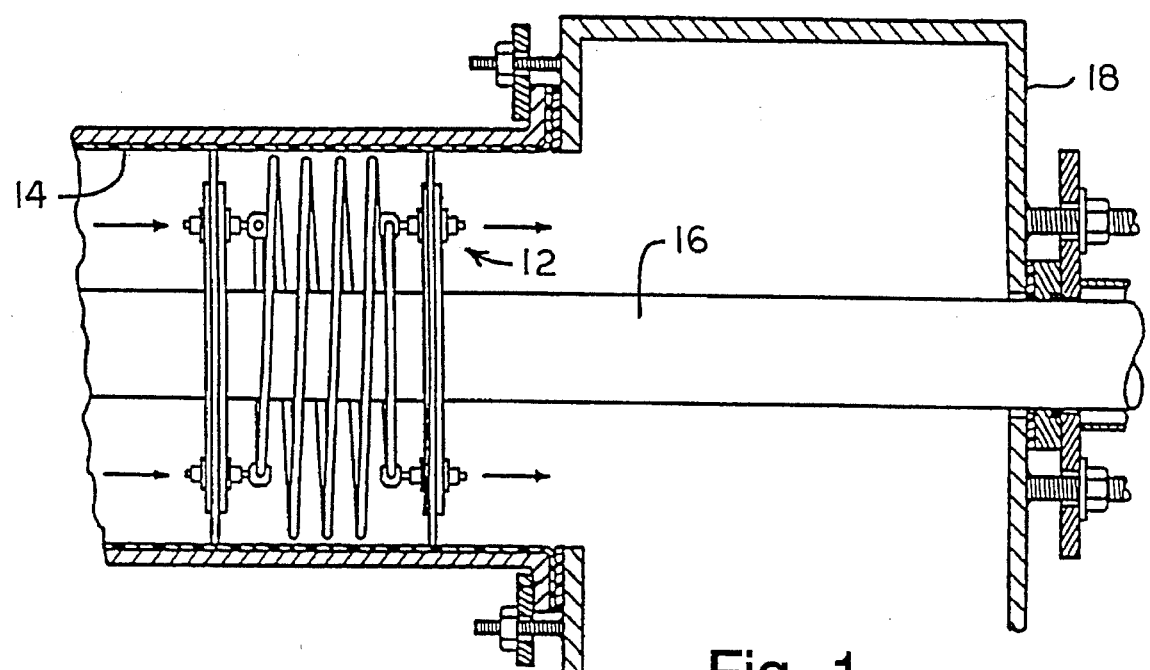
FIG. 1 is a fractional side elevational view partly in cross section of a portion of a reactor showing a shuttling scraper of the prior art approaching an end position in a reaction chamber.

When the shuttling scraper is in the parked position in the end manifold 18 of FIG. 1, the wiper cartridge is protected from the ultraviolet radiation and the heat of the ultraviolet lamp by the shuttling scraper wiper assembly 20 or 22. This also helps to extend the life of the wiper cartridge.

Upon reversal of flow at the start of shuttling scraper travel, the shuttling scraper wipers move into the tubular reaction chambers without initially dragging the wiper cartridge with them. Once the piston action of the liquid upon the wiper assembly of the shuttling scraper has been established, the cartridge is brought into the tubular reaction chamber by the trailing wiper of the shuttling scraper. This arrangement allows a tighter fit of the wiper on the quartz tube without stalling the shuttling scraper. It also allows the shuttling scraper to function at much lower flow rates than were possible in the previous design where all of the scraping was done by the wipers 26. That is because the shuttling scraper is free to move into the tubular reaction chamber and establish a piston effect, using the full liquid pressure before it starts dragging the wiper cartridge along the tube.

Figure 5:
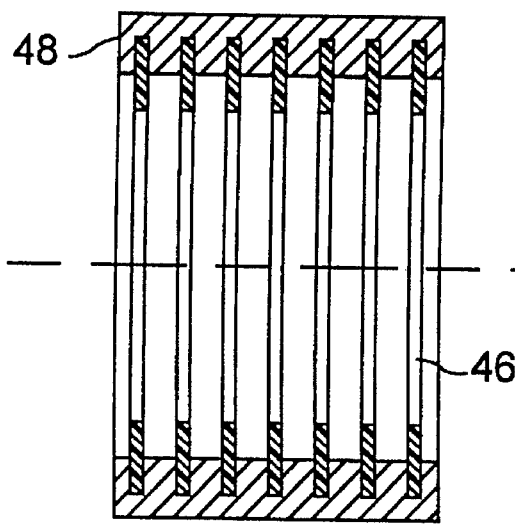
FIG. 5 is a side elevational view in cross section showing a wiper assembly in a first alternative embodiment; and, FIG. 6 is a side elevational view in cross section showing a wiper assembly in a second alternative embodiment.

Other types of wiper cartridge are also conceivable. For example, in the embodiment of FIG. 5 a number of wipers of annular form, of which the wiper 46 is typical, are composed of VITON and are assembled into a retainer 48. Like the wiper cartridge of FIG. 3, the assembly of FIG. 5 also occupies the space surrounded by the spring 24 between the first and second wiper assembly 20 and 22.

Figure 6:
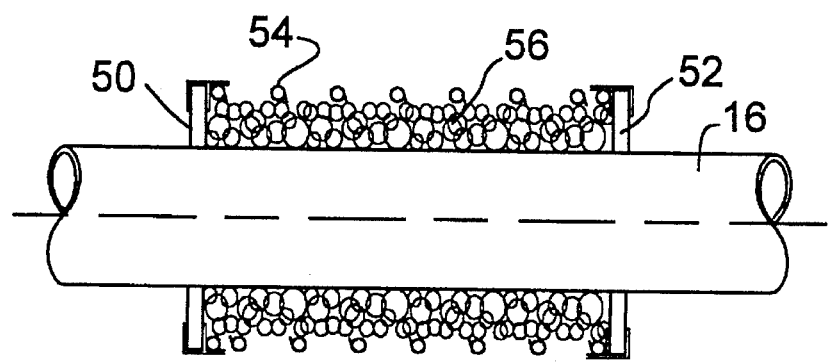

In the wiper assembly of FIG. 6, a small cylindrical cage is formed by the wiper cartridge 50 at one end, the wiper cartridge 52 at the other end and the helical spring 54 that connects the wiper cartridges 50 and 52. The cage thus formed is filled with a scrubber material 56 which may consist of stainless steel turnings or stainless steel wool as appropriate to the type of fouling encountered. It should be noted that the entire wiper assembly shown in FIG. 6 has an outside diameter less than the inside diameter of the spring 24 of FIG. 2 and has a length less than the minimum separation between the wiper assemblies 20 and 22 of FIG. 2, thereby permitting the assembly of FIG. 6 to fit into the space enclosed by the spring 24. This in turn enables the shuttling scraper, when using the wiper assembly of FIG. 6, to move easily from its parked position into the tube upon reversal of the flow direction.

In the best mode for carrying out the invention, it has been found that it is desirable when using any of the wiper cartridges to reduce the diameter of the center hole of the wiper support washers 28 and 30 of FIG. 2 so that they bear on the quartz tube, thereby eliminating any deformation of the center hole of the shuttling scraper. This helps to maintain the concentricity of the shuttling scraper with the tubular reaction chamber, thus promoting smoother and more reliable establishment of the piston action, especially at low flow rates. The ability of the shuttling scraper to function at much lower flow rates when using the wiper cartridge is primarily attributable to the fact that the piston action is more easily established without the drag of the wiper on the quartz tube. That drag is not encountered until the shuttling scraper has moved into the tubular reaction chamber sufficiently that the wiper cartridge makes contact with the leading face of the trailing wiper assembly.

Thus, there has been described an improvement for use with a shuttling scraper which greatly improves the cleaning ability of the shuttling scraper and which permits operation at much lower flow rates than were previously required when the wiper cartridge was not used. In accordance with the present invention, the wiper cartridge is not physically attached to the shuttling scraper, but instead is held captive within it. The wiper cartridge is appreciably shorter than the space between the first and second wiper assembly of the shuttling scraper, and this permits the shuttling scraper to make its initial move before experiencing the drag caused by movement of the wiper cartridge along the quartz tube.

It will be recognized that many design variations are possible within these general parameters, and such equivalent alternative designs are considered also to be within the scope of the present invention, which is limited only by the following claims.

What is claimed is:

1. An improved shuttling scraper for cleaning the outside surface of a tube mounted coaxially in a cylindrical reaction chamber in which a liquid flows in the annular space between the tube and the wall of the cylindrical reaction chamber, said improved shuttling scraper comprising:

a first wiper assembly having an annular form and lying in a first plane perpendicular to the axis of the cylindrical reaction chamber;

a second wiper assembly having an annular form and lying in a second plane perpendicular to the axis of the cylindrical reaction chamber and spaced from the first plane;

a helical spring connecting said first wiper assembly and said second wiper assembly and resiliently maintaining a space between them; and, a wiper cartridge of annular form lying in a plane intermediate the first plane and the second plane, surrounding the tube and engaging the tube in a tight sliding grip, and having an outside diameter less than the inside diameter of the helical spring, whereby said wiper cartridge is captive between said first wiper assembly and said second wiper assembly and does not come in contact with said helical spring, whereby movement of said wiper cartridge relative to said tube is delayed until said shuttling scraper has established a piston relationship with the cylindrical reaction chamber, thereby permitting said shuttling scraper to operate at lower flow rates than would be possible if said wiper cartridge were not present.

* * * * *